(12) United States Patent
Hsien

(10) Patent No.: US 6,269,173 B1
(45) Date of Patent: Jul. 31, 2001

(54) INSTANT RESPONSE BROADCAST BOARD SYSTEM AND METHOD

(75) Inventor: Kuan-Hong Hsien, Taipei (TW)

(73) Assignee: Onemore Inc., Taipei (TW)

( * ) Notice: Subject to any disclaimer, the term of this patent is extended or adjusted under 35 U.S.C. 154(b) by 0 days.

(21) Appl. No.: 09/109,920

(22) Filed: Jul. 2, 1998

(30) Foreign Application Priority Data

May 15, 1998 (TW) .................................................. 87107585

(51) Int. Cl.[7] .......................................................... G06K 9/00
(52) U.S. Cl. ............................................. 382/103; 705/14
(58) Field of Search .............................. 370/392; 382/1, 382/103, 173, 107, 100; 455/3.3; 705/14; 345/112, 121, 123

(56) References Cited

U.S. PATENT DOCUMENTS

| | | | |
|---|---|---|---|
| 4,601,053 | * 7/1986 | Grumet | 382/1 |
| 5,163,133 | * 11/1992 | Morgan et al. | 395/800 |
| 5,323,470 | * 6/1994 | Kara et al. | 382/1 |
| 5,630,204 | * 5/1997 | Hylton et al. | 455/3.3 |
| 5,708,659 | * 1/1998 | Rostoker et al. | 370/392 |
| 5,828,782 | * 10/1998 | Sunakawa et al. | 382/173 |
| 5,912,980 | * 6/1999 | Hunke | 382/103 |
| 5,966,696 | * 10/1999 | Giraud | 705/14 |
| 6,081,606 | * 6/2000 | Hansen et al. | 382/107 |

* cited by examiner

Primary Examiner—Matthew C. Bella
(74) Attorney, Agent, or Firm—Rabin & Champagne, P.C.

(57) ABSTRACT

An interactive instant response broadcast board comprises a microcomputer and a plurality of display broadcast boards and a plurality of detecting elements arranged thereon that detect the movement of objects detected in front of the broadcast boards, and transmits information to the microcomputer. A host server transmits and receives information to and from broadcast boards and extracts the information read from the microcomputer and detected by the detecting elements, and downloads the image messages and programs to at least one broadcast board for displaying. The broadcast board may be used in public place without being connected to a network.

8 Claims, 5 Drawing Sheets

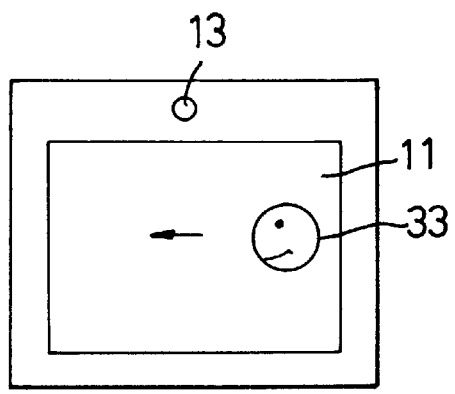
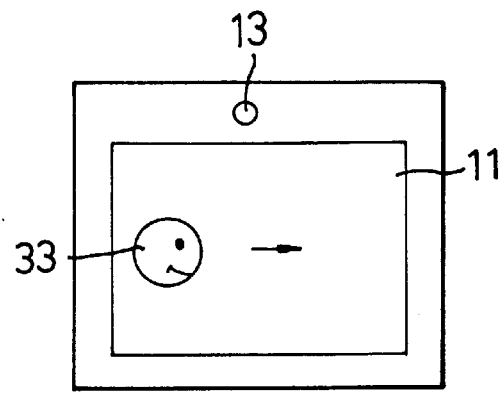
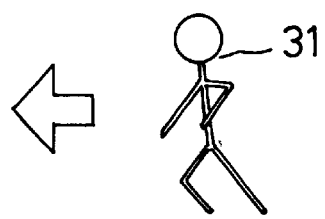
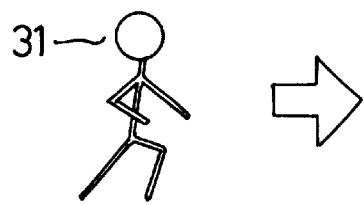
FIG.3          FIG.4
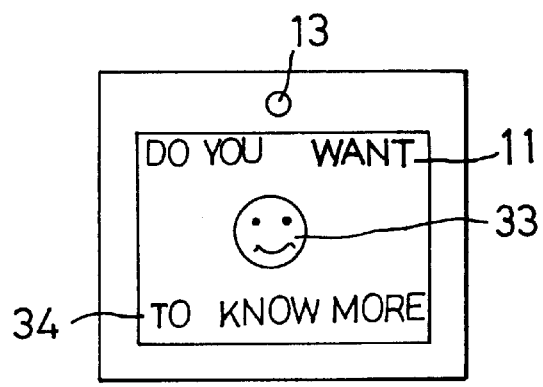
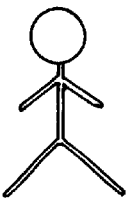
FIG.5

INSTANT RESPONSE BROADCAST BOARD SYSTEM AND METHOD

BACKGROUND OF THE INVENTION

1. Field of the Invention

The present invention is related to a broadcast board system, especially to an instant response broadcast board device and method of the same.

2. Description of the Prior Art

The current propagating efficiency of the broadcast board is relatively low. After a design of an advertisement is determined, then the content of the broadcast board must be edited, printed, transported, and changed. Thus the effect thereof is not as fast as we expect.

In supermarkets for instance, or some dedicated display boards, the contents regarding the products exhibited on the broadcast boards are often static including, for example a, playbill, for propagating commercial information.

Further, as to how many people ever see the displayed products, interest of the displayed products, or further have any questions regarding the displayed products are not known by the supplier. Thus the managers of the product supplier or the product suppliers can not know about the response of the market and the effectiveness of the display. Furthermore, the customer could not be advised in time if there are any question regarding the displayed products.

For a supplier or a promotion manager, if there is information about how people are interested in their products, then they may understand market trend rapidly and accurately so to improve selling and advertising programs.

Furthermore, the conventional broadcast boards are not interactive. For example, TV walls or LED broadcast boards that are located in the streets perform only download operations and have no interactive functions.

In conventional broadcast boards, the content is predetermined and the viewer may only watch the fixed information. The broadcast board can not interact with the people viewing the broadcast board so this is not a personalized design.

SUMMARY OF THE INVENTION

The object of the present invention is to provide an instant response broadcast board method and device for viewing customers.

A further object of the present invention is to provide a broadcast board system and device for propagating new broadcasts or information everywhere rapidly.

A still further object of the present invention is to provide a broadcast board system and device for in depth interaction with viewing customers.

A yet further object of the present invention is to provide a broadcast board system and device which is interesting and attractive. Another object of the present invention is to provide a broadcast board system and device which may count the number of people have encountered the broadcast board and may send the statistical information to a host server.

A digital camera or other detecting element on the broadcast board is used to detect the motion of objects including, for example, customers in front of the broadcast board so as to form a microcomputer display broadcast board, wherein the content of the broadcast board may be changed with the motion of the object.

When a customer stops in front of the board is in the effective range of detection and further remains threat for a predetermined time threshold for a while, a menu pattern will be displayed on the broadcast board, thus the customer may select one options on the menu to generate an instruction. Therefore, the relative broadcast or information may selectively interact with the customer thereby. 30 If further a credit card input device is used together with a camera, the image for those who use the credit card may be transferred to a control center, thus the transaction through credit cards are safely protected.

Broadcast boards are distributed in public places having a great number of people passing through, including the exhibition frames of the supermarket, and the information regarding viewers who have encountered a particular broadcast board is transferred to a host server. Thus the customer information may be concentrated to a host server, and any information of the host server may be transferred to the broadcast boards and downloaded thereby. Of course, the identification number of the broadcast boards may be constructed for selectively performing the downloading the images and programs.

The display content of the broadcast board may be presented by interesting images, planer or stereo, wherein the stereo image may be formed by a multi-layer screens with different depths of views. The displacement relation of each screen is set according to the depth of the views and is matched with the position at the target viewers so a stereo visual feeling is simulated.

The method for controlling a microcomputer and the display of a broadcast board is by the way of analysis the pixels of image captured by a digital camera, it may use an intention identification method or other algorithm.

From the intention identification method, the image of an object is captured by a video camera, then the pixels with respect to the image signal are analyzed by a trend method or a centering method for judging the movement of the object so to generate different instructions for different directions, such as, stillness, slow movements or fast movements. Whereby, a single video camera built with a computer is used to analyze the variation of pixels for determining the movement of the object in (X, Y) coordinates, further including the intention for the movement in z axis, and moreover, a clicking signal output may be generated.

The present invention will be better understood and its numerous objects and advantages will become apparent to those skilled in the art by referencing to the following drawings:

BRIEF DESCRIPTION OF THE DRAWINGS

FIG. 3 is a plane view of the embodiment of the broadcast board in the present invention.

FIG. 4 is the planar view of FIG. 3, shown from different orientation.

FIGS. 5 to 7 are the plane views for different embodiments of the broadcast board image in the present invention.

DETAILED DESCRIPTION OF THE PREFERRED EMBODIMENT

Figure 1:
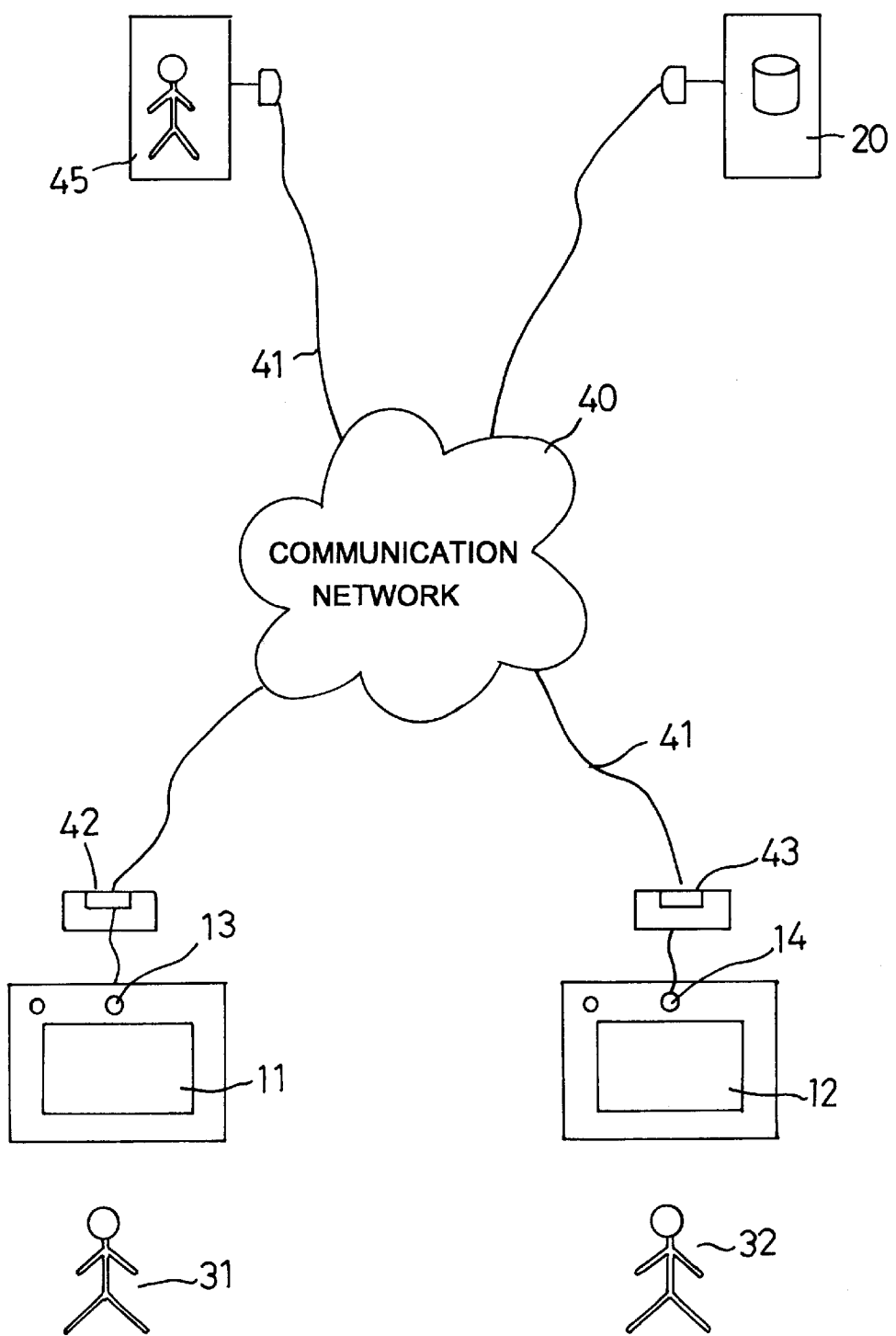
FIG. 1 is a view shown the preferred embodiment of the instant response broadcast board device and system of the present invention.
Figure 2:
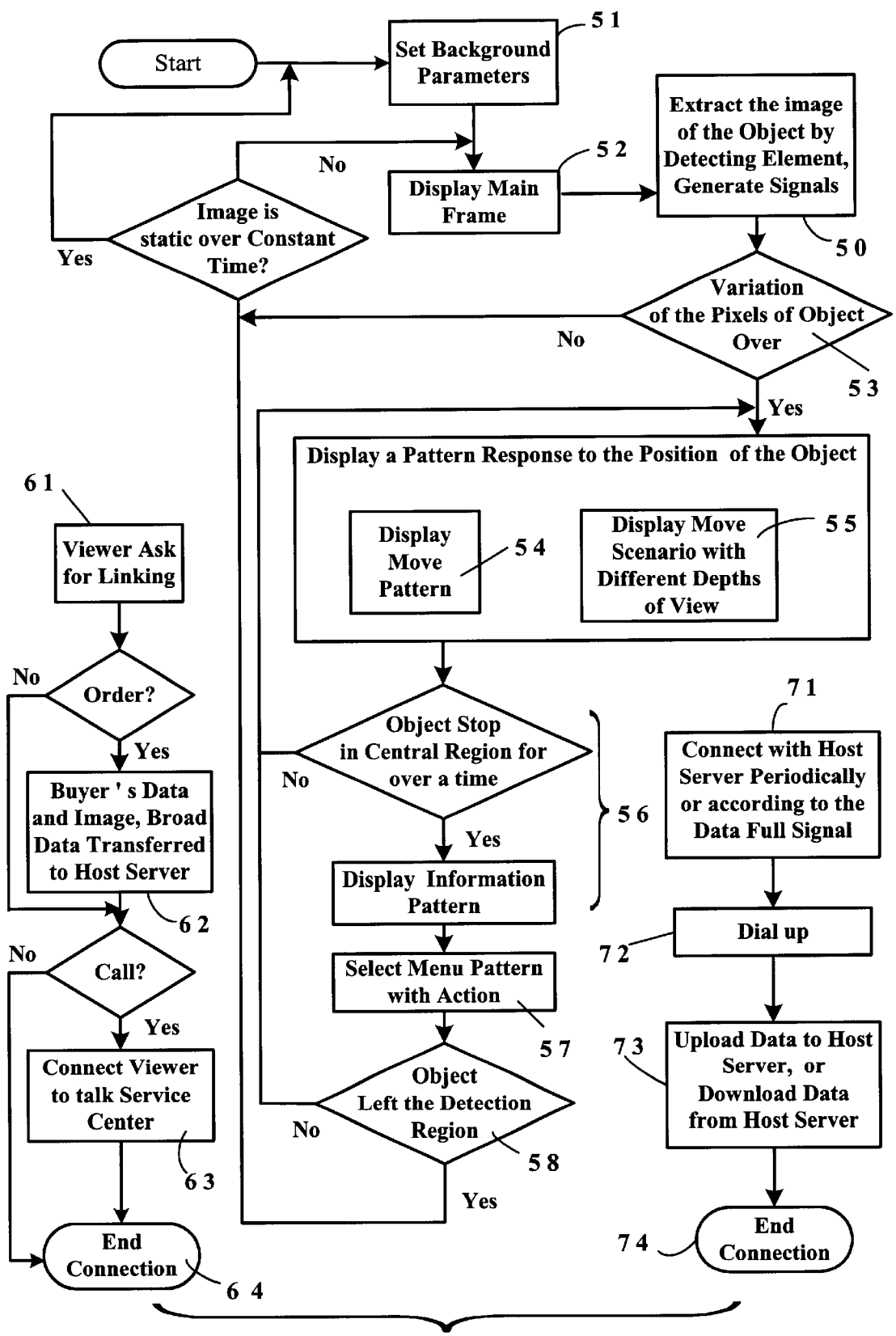
FIG. 2 is a flow diagram for constructing the broadcast board in the present invention.

In FIG. 1 and FIG. 2, an instant response broadcast board of the present invention comprises a plurality of display broadcast boards (11, 12) each of which is controlled by a microcomputer preferably built therein; and a plurality of detecting elements, for example, the camera lenses (13, 14) shown in FIG. 1, is arranged on the broadcast boards (11, 12), respectively, for detecting objects in front of the board, including viewing customers (31, 32) in FIG. 1, and the movement of such objects. Then the detected signal is transferred to the microcomputer and the result is processed in response to the broadcast board.

The broadcast board installed with a detecting element and controlled by a microcomputer may be made singly as interesting contents for displaying a planar or stereo image, wherein the stereo image may be formed by a multi-layer screens with different depths of perspective. Each of the screens is set with different displacement relation according to the depth of view and is matched to the interaction of the viewing position to simulate the feeling of stereo.

If there are a group of broadcast boards, then a host server (20) may be installed, the messages may be transferred between public switched telephone network (PSTN), or internet service provider (ISP) (40) through modems (42, 43) and the host servers by communication line (41). Thus the host server (20) may communicate with the broadcast boards (11, 12) to extract the information thereof and download the image messages and programs to at least one broadcast board for displaying.

Figure 8:
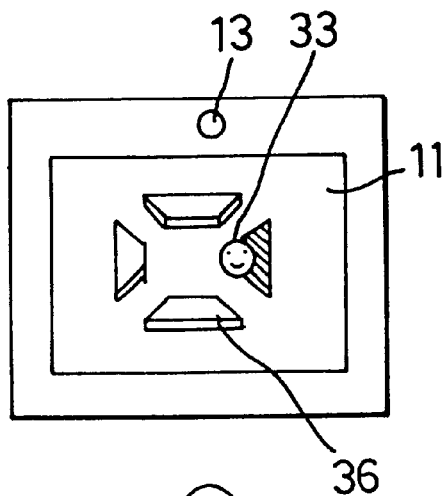
FIG. 8 is the planar view of FIG. 7, further showing customer selecting the menu pattern on the broadcast board.
Figure 6:
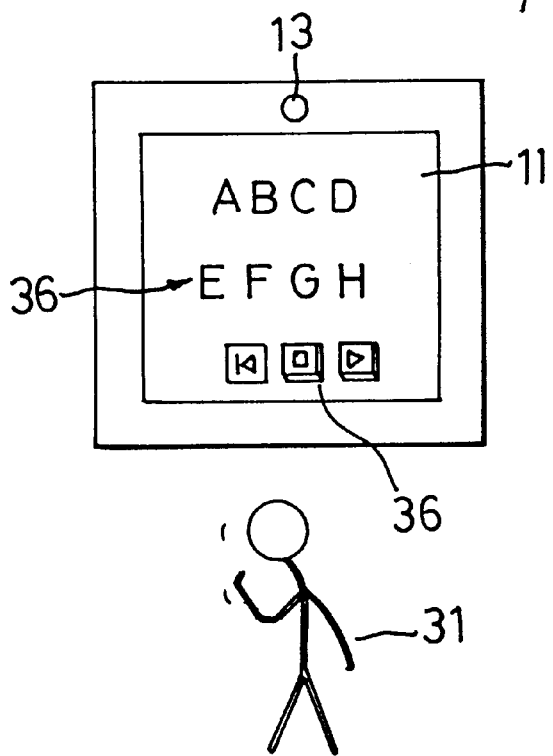
Figure 9:
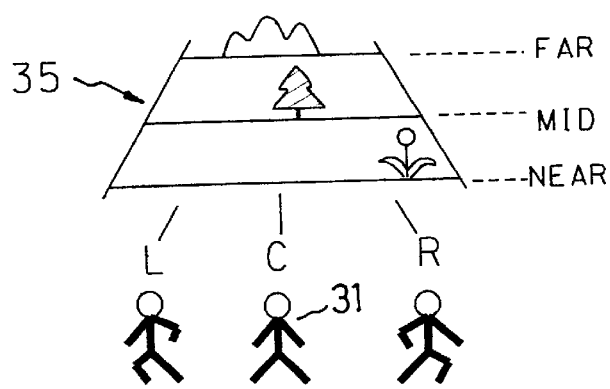
FIG. 9 is a view showing a multi-layered screen with different depths of views.
Figure 10:
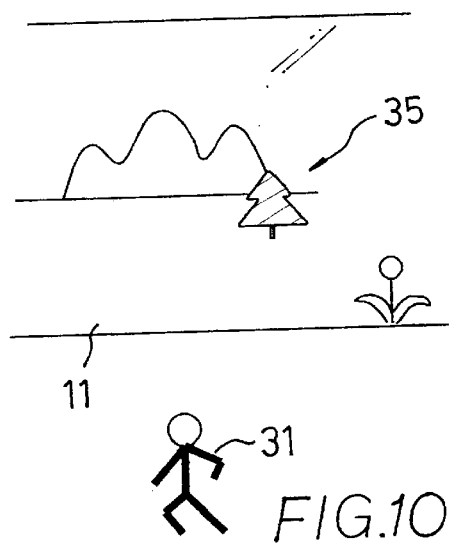
FIGS. 10 to 12 are the views for different frames of the broadcast board image in the FIG. 9 according to the object movements.
Figure 11:
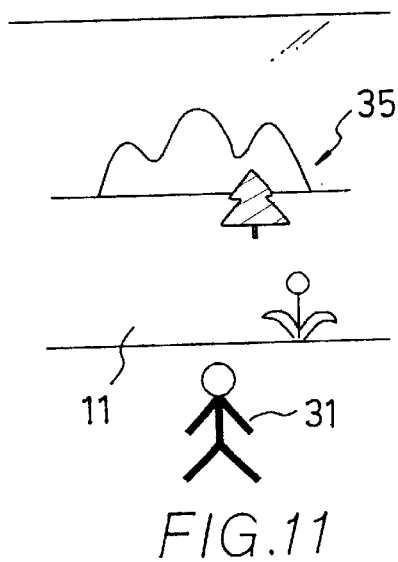
Figure 12:
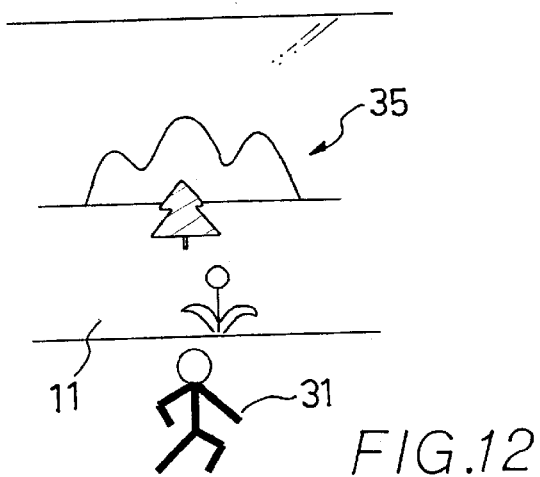

The instant response broadcast board system of the present invention is shown in FIG. 2. First the image signal (block 50) of the object in front of the broadcast board is extracted by a detecting element. Then the signal is transferred to a microcomputer for processing it and the relative message is displayed on the broadcast board. The method includes the following steps:

(A) setting the image information from detecting means as reference background and setting related parameters, if it is static for a predetermined amount of time (block 51);

(B) displaying the main frame in the broadcast board from the microcomputer;

(C) as the pixels which are moved synchronously with the image of the detected object have attained a preset parameter, for example, if the total number of the pixels is larger than a set value, and the moving speed value of the pixels that move synchronously on the background is smaller than a preset value, the pixel group with the largest size, slowest speed and closest position to the center will be selected for tracking the object (block 53);

(D) the respective frame on the display broadcast board is changed with the movement of the object (block 54), for example to display a respective frame (33) which is moved with the object synchronously (referring to FIGS. 3 and 4); or a multi-layered screen (35) with different depths of views is constructed (referring to FIG. 9), and the respective speed of displacement for each layered screen is different from each other (referring to FIG. 10 to 12), and the screen is moved with the movement of the object for generating a stereo visual feeling synchronously. For example, the viewer stands on the central position in front of the broadcast board to see the screen (35), and the respective frame is shown in FIG. 12; when the viewer (31) moves leftwards, the viewing frame is as that shown in FIG. 10; while when the viewer (31) moves to the right, the viewing frame is as that shown in FIG. 11. Another embodiment of the aforementioned respective frame may be a cartoon varied synchronously as that shown in FIGS. 3 or 4;

(E) when the object is stopped for a short while, the size of the image pattern is larger than a preset value, and the speed of the object is smaller than a preset value, most of the pattern having entered into a preset central section of the broadcast board by an information pattern (block 56) will be displayed, such as the pattern (34) for further entail information shown in FIG. 5, or the menu pattern as shown in FIGS. 6 and 8. The contents of the menu includes: (a) hold, if you want to know more; and (b) indicate a selection by making predetermined movements; such as if "yes" please move your arms up and down, and if "no", please move your arms side-by-side; (c) if "A", then move to the left and (d) if "B" is selected, the move to the right;

(F) the action of the viewer may be detected according to the practical requirement (block 57), the methods include detecting the moving trend of the object pixels, or detecting the moving position of geometric center of the viewer, or other constructed manner for instructing selections by the microcomputer; and (G) when the detected viewer have the detection region, then the procedure is ended and the process is returned to the process (B). If the viewer is still in the detecting region, then the detecting process is performed continuously, the process returns to the step (B), and after the object has stayed there for predetermined period of time, the background parameter is reset and then the main frame is displayed continuously in the even a saboteur has placed a stationary object, in front of the screen to disrupt normal operation.

The host server (20) may communicate with all broadcast boards (11, 12) and perform the work of downloading and uploading, to record in periods of time the number of the effective objects (viewers) (block 71), including a viewer merley passing through the detecting area of the broadcast boards, viewers who have stopped in front of the broadcast boards, and the viewers who interactively operate the broadcast boards (block 72), to upload all the information from the broadcast boards to the host server (20) or to download the information from the host server (20) to the broadcast boards (block 73), then the communication therebetween is disconnected.

The customer may make a selection from a menu of the broadcast board by following an instruction for such selection by making an instructed body motion, therefore, the relative broadcast information or a further selected interaction may be processed in this manner. If a credit card input device is further arranged, then a camera lens will be used, if the customer asks for a transaction or consulation (block 61), the image for the customer and the individual identification number and the broadcast board identification number of the customer will be transferred to the host server (20) on the control center (block 62), therefore, the credit card transaction is protected. Even if the customer asks for a consultation, then the audio signal is connected to a customer service center (45) to talk with an on line service person (block 63), finally, the dialog therebetween is disconnected (block 64).

Figure 7:
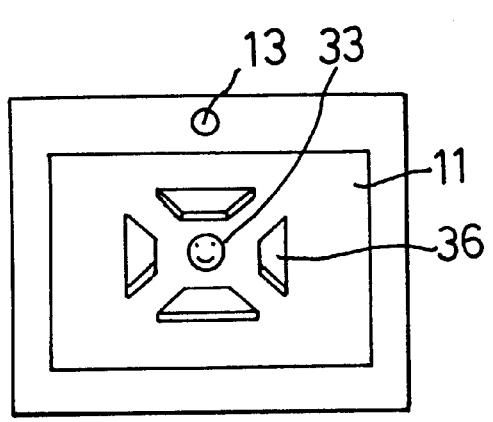

FIGS. 6, 7, and 8 are schematic views showing that the present invention is connected with the menu clicks on screen. The broadcast board displays with these menus of options patterns and cursor pattern which are operated by the minor body movement, such as movement of the viewers hands, and this is similar to a remote control.

The detecting element is preferred to be a camera lens, but if an optic, thermal, or touch control sensor is used, it is preferred that at least three detecting elements are arranged on the different positions of the broadcast board, therefore, the detection for the object may be achieved.

Although certain preferred embodiment of the present invention is shown and described in detail, it should be understood that various changes and modification may be made without departing from the scope of the appended claims.

What is claimed is:

1. A method for forming an instant response broadcast board system in which image signals of objects in front of a broadcast board are detected, and image signals of the detected objects are transferred to a microcomputer for processing, and information from the microcomputer is displayed on the broadcast board, the method comprising the steps of:

(A) setting the detected image signals as reference background image signals and setting related parameters if the detected image signals remain stationary for a threshold amount of time;

(B) displaying a main frame in the broadcast board from the microcomputer;

(C) tracking the detected objects, if the image pixels of the detected objects other than background has reached all preset parameters;

(D) changing the frame that is displayed on the broadcast board according to the movement of the detected objects, (i) including displaying a pattern that moves synchronously with movement of the detected objects, or (ii) including providing multi-layer screens having displaying different image layers representing different viewing perspectives, and that move at different speeds with movements of the detected objects to generate a stereo visual effect for a viewer;

(E) displaying a frame of a menu on the broadcast board when the detected objects have stopped, the menu including items instructing the viewer to do the following:

(a) remain still for more information, and (b) move his or her body to make a selection; and (F) if the detected objects have not vacated a region of detection, returning to said step (B), and when the detected objects remain stationary in the region of detection for a threshold amount of time, resetting the background parameter.

2. The method as recited in claim 1, further including the steps of:

(G) recording and counting the number of detected objects in front of said broadcast board; and (H) building a host server to connect and communicate with said broadcast board for uploading and downloading information.

3. The method as recited in claim 2, wherein said step (H) further comprises the step of counting and recording the statistic information of persons and objects that pass by said broadcast board, the number of persons and objects that stop in front of said broadcast board, and the number of persons and objects that operate said broadcast board.

4. The method recited in claim 1, wherein in said step (C), when the total number of pixels that move synchronously on the background reaches a predetermined threshold value, the pixel group with the slowest speed and closest position to the center of said broadcast board are selected for tracking the person or object.

5. The method as recited in claim 1, wherein the moving trend of the respective pixels of a static object image is detected for sensing the minor movement of the static persons or object so as to generate an instruction.

6. A method for forming an instant response broadcast board system in which image signals of objects in front of a broadcast board are detected, and image signals of the detected objects are transferred to a microcomputer for processing, and information from the microcomputer is displayed on the broadcast board, the method comprising the steps of:

(A) setting the detected image signals as reference background image signals and setting related parameters if the detected image signals remain stationary for a threshold amount of time;

(B) displaying a main frame in the broadcast board from the microcomputer;

(C) tracking the detected objects, if the image pixels of the detected objects other than background has reached all preset parameters;

(D) changing the frame that is displayed on the broadcast board according to the movement of the detected objects, including
displaying a pattern that moves synchronously with movement of the detected objects;

(E) displaying a frame of further information on the broadcast board when the detected objects have stopped, and (F) if the detected objects have not vacated a region of detection, returning to said step (B), and when the detected objects remain stationary in the region of detection for a threshold amount of time, resetting the background parameter.

7. A method for forming an instant response broadcast board system in which image signals of objects in front of a broadcast board are detected, and image signals of the detected objects are transferred to a microcomputer for processing, and information from the microcomputer is displayed on the broadcast board, the method comprising the steps of:

(A) setting the detected image signals as reference background image signals and setting related parameters if the detected image signals remain stationary for a threshold amount of time;

(B) displaying a main frame in the broadcast board from the microcomputer;

(C) tracking the detected objects, if the image pixels of the detected objects other than background has reached all preset parameters;

(D) changing the frame that is displayed on the broadcast board according to the movement of the detected objects, including providing multi-layer screens displaying different viewing perspectives, and that move at different speeds with movements of the detected objects to generate a stereo visual effect for a viewer;

(E) displaying a frame of further information on the broadcast board when the detected objects have stopped; and (F) if the detected objects have not vacated a region of detection, returning to said step (B), and when the detected objects remain stationary in the region of detection for a threshold amount of time, resetting the background parameter.

8. A method for forming an instant response broadcast board system in which image signals of objects or persons in front of a broadcast board are detected, and image signals of the detected objects are transferred to a microcomputer for processing, and information from the microcomputer is displayed on the broadcast board, the method comprising the steps of:

(A) setting the detected image signals as reference background image signals and setting related parameters if the detected image signals remain stationary for a threshold amount of time;

(B) displaying a main frame in the broadcast board from the microcomputer;

(C) tracking the detected objects, if the image pixels of the detected objects or persons other than background has reached all preset parameters;

(D) changing the frame that is displayed on the broadcast board according to the movement of the detected objects or persons;

(E) displaying a frame of a menu on the broadcast board when a detected person has stopped, the menu including items instructing the detected person to do the following:
  (a) remain still for more information, and
  (b) move his or her body to make a selection;

(F) detecting a minor movement of the detected person that has stopped, and in response to the detected movement, generating an instruction so that the microcomputer may perform a processing option; and (G) if the detected objects have not vacated a region of detection, returning to said step (B), and when the detected objects remain stationary in the region of detection for a threshold amount of time, resetting the background parameter.

* * * * *